(12) United States Patent
Nakao et al.

(10) Patent No.: US 8,349,442 B2
(45) Date of Patent: Jan. 8, 2013

(54) AGRICULTURAL FILM

(75) Inventors: Takuya Nakao, Tokyo (JP); Akemi Kato, Tokyo (JP); Keisuke Abe, Tokyo (JP); Takashige Yoneda, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/185,666

(22) Filed: Jul. 19, 2011

(65) Prior Publication Data

US 2011/0274912 A1 Nov. 10, 2011

Related U.S. Application Data

(63) Continuation of application No. PCT/JP2010/051984, filed on Feb. 10, 2010.

(30) Foreign Application Priority Data

Feb. 13, 2009 (JP) .................................. 2009-030955
Feb. 13, 2009 (JP) .................................. 2009-030956

(51) Int. Cl.
*B32B 3/26* (2006.01)
*B32B 9/00* (2006.01)
*B32B 27/00* (2006.01)

(52) U.S. Cl. ............... 428/304.4; 428/308.4; 428/318.4; 428/319.7

(58) Field of Classification Search ............... 428/304.4, 428/308.4, 318.4, 319.7
See application file for complete search history.

(56) References Cited

FOREIGN PATENT DOCUMENTS

| | | |
|---|---|---|
| JP | 60-69181 | 4/1985 |
| JP | 7-53747 | 2/1995 |
| JP | 2007-63477 | 3/2007 |
| JP | 2007-99884 | 4/2007 |
| JP | 2003-49003 | 2/2009 |

OTHER PUBLICATIONS

English Abstract of JP 2007-099884.*
English translation of JP 2007-099884.*
U.S. Appl. No. 13/186,510, filed Jul. 20, 2011, Nakao, et al.
International Search Report issued Apr. 27, 2010 in PCT/JP10/051984 filed Feb. 10, 2010.

* cited by examiner

*Primary Examiner* — Victor Chang
(74) *Attorney, Agent, or Firm* — Oblon, Spivak, McClelland, Maier & Neustadt, L.L.P.

(57) ABSTRACT

To provide an agricultural film which has high transparency and which has a coating film formed with excellent abrasion resistance (adhesion), hydrophilicity (anti-fogging, wettability and anti-fouling) and hydrophilic durability.

An agricultural film 10 comprising a base material film 12 and a porous hydrophilic coating film 14 formed on the base material film 12. The hydrophilic coating film 14 contains boehmite particles, silica particles and a binder, wherein (a) the atomic ratio of Al to Si (Al/Si) is from 0.2 to 5.0, (b) the average particle diameter of the silica particles is from 5 to 50 nm, and (c) the crystallite diameter of the boehmite particles, as calculated from the diffraction peak of the (120) plane is from 20 to 50 nm. The hydrophilic coating film 14 is formed by applying a composition comprising boehmite particles, silica particles, a binder and water, on a surface of a base material film, followed by drying.

20 Claims, 1 Drawing Sheet

AGRICULTURAL FILM

TECHNICAL FIELD

The present invention relates to an agricultural film having a hydrophilic coating film.

BACKGROUND ART

As an installation (such as a greenhouse) constituted by a transparent roof material or a transparent side wall material, wherein plants are cultivated, there is an installation, of which the roof or the side wall is constituted by a transparent synthetic resin film. In the present invention, such an installation for cultivation of plants is referred to as an agricultural house, and a transparent synthetic resin film to be used for the roof or side wall is referred to as an agricultural film.

With an agricultural film spread to form an agricultural house, if dew condensation or fogging takes place on its surface during the cultivation of plants, the transmittance of sunlight may be deteriorated, and the growth of plants may be adversely affected. Accordingly, it has been attempted to impart hydrophilicity to the surface of an agricultural film for the purpose of improving the anti-fogging property, wettability (property whereby water droplets are uniformly wettingly spread to form a water film), anti-fouling property, etc.

The following ones are known as agricultural films having hydrophilicity imparted to the surface.

(1) One obtained by applying an anti-fogging composition comprising silica sol and alumina sol having different average particle diameters, a surfactant and a liquid dispersion medium on a surface of a base material film, followed by drying to form a coating film (Examples 4 to 6 in Patent Document 1).

(2) One obtained by applying a coating fluid comprising colloidal alumina, colloidal silica and an anionic surfactant in a specific ratio, on a surface of a base material film, followed by drying to form a coating film (Examples 1 to 7 in Patent Document 2).

(3) One obtained by applying a coating anti-fogging agent comprising an aqueous medium, colloidal alumina, colloidal silica and a water-soluble resin in a specific ratio, on a surface of a base material film, followed by drying to form a coating film (Examples 1 to 14 in Patent Document 3).

(4) One obtained by applying an inorganic coating composition comprising alumina particles, of which an average of aspect ratios of agglomerated particles in a dispersion medium is from 3 to 20, an average particle diameter in a long axis direction is from 100 to 500 nm, and an average particle diameter in a short axis direction is from 2 to 100 nm, silica/alumina composite particles, of which an average particle diameter of agglomerated particles in a dispersion medium is at most 150 nm, and water, on a surface of a base material film, followed by drying to form a coating film (Patent Document 4).

However, in the agricultural films (1) and (2), alumina particles and silica particles are merely attached by a surfactant on the surface of a base material film, and the adhesion between the coating film and the base material film is inadequate. Accordingly, the abrasion resistance of the coating film is inadequate. Further, the water resistance of the coating film is low, whereby the hydrophilicity cannot be maintained for a long period of time.

In the agricultural film (3), the coating film contains a water-soluble resin (binder), whereby the adhesion is improved as compared with the agricultural films (1) and (2), but the adhesion between the coating film and the base material film is still inadequate. Accordingly, the abrasion resistance of the coating film is inadequate. Further, the water resistance of the coating film is low, and the hydrophilicity cannot be maintained for a long period of time.

In the agricultural film (4), as compared with the agricultural films (1) to (3), the adhesion between the coating film and the base material film is high, and the abrasion resistance of the coating film is good. Further, in an accelerated weather resistance test, the hydrophilicity can be maintained for a long period of time. However, in a real outdoor exposure test, the hydrophilicity abruptly drops at some time. Therefore, it is desired to further improve the durability of hydrophilicity (hereinafter referred to as hydrophilic durability).

PRIOR ART DOCUMENTS

Patent Documents

Patent Document 1: JP-A-60-69181
Patent Document 2: JP-A-7-53747
Patent Document 3: JP-A-2003-49003
Patent Document 4: JP-A-2007-63477

DISCLOSURE OF INVENTION

Technical Problem

The present invention is to provide an agricultural film which has a high transparency and which has a coating film formed with excellent abrasion resistance (adhesion), hydrophilicity (anti-fogging property, wettability and anti-fouling property) and hydrophilic durability.

Solution to Problem

The present invention provides an agricultural film comprising a base material film and a porous hydrophilic coating film which is formed on the base material film and which contains boehmite particles, silica particles and a binder and satisfies the following (a) to (c):

(a) the atomic ratio of Al to Si (Al/Si) is from 0.2 to 5.0,
(b) the average particle diameter of the silica particles is from 5 to 50 nm, and
(c) the crystallite diameter of the boehmite particles, as calculated from the diffraction peak of the (120) plane, is from 20 to 50 nm.

The above binder is preferably a nonionic water-soluble organic binder.

The nonionic water-soluble organic binder is preferably a water-soluble polyvinyl alcohol.

The above base material film is preferably a fluororesin film.

The fluororesin film is preferably a tetrafluoroethylene/ethylene copolymer film.

The above hydrophilic coating film preferably has a thickness of from 100 to 700 nm.

In the hydrophilic coating film of the agricultural film of the present invention, the total pore volume of pores having diameters of from 1 to 60 nm is preferably from 1.0 to 20.0 [$\times 10^{-4}$ cc/g].

The proportion of the binder in the hydrophilic coating film is preferably from 0.5 to 15 parts by mass per 100 parts by mass in total of the boehmite particles and the silica particles.

The haze of the hydrophilic coating film is preferably at most 5%.

The process for producing the agricultural film of the present invention is a process which comprises applying a composition comprising boehmite particles, silica particles, a binder and water, on a surface of a base material film, followed by drying to form a hydrophilic coating film.

In the process, the base material film is preferably a fluororesin film, and it is preferred to preliminarily apply surface treatment to improve wettability to the surface of the fluororesin film on which the hydrophilic coating film is to be formed.

Advantageous Effects of Invention

According to the present invention, it is possible to provide an agricultural film which has high transparency and which has a coating film formed with excellent abrasion resistance (adhesion), hydrophilicity (anti-fogging property, wettability and anti-fouling property) and hydrophilic durability.

DESCRIPTION OF EMBODIMENT

<Agricultural Film>

Figure 1:
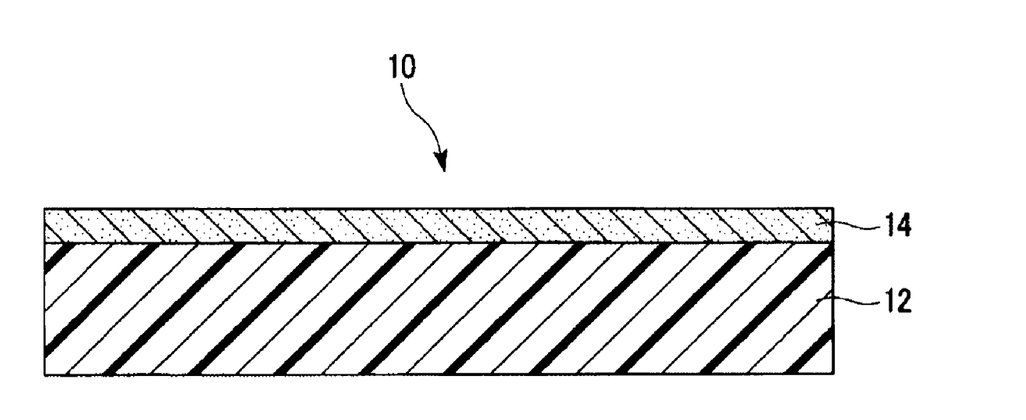
FIG. 1 is a cross-sectional view illustrating an example of the agricultural film of the present invention.

FIG. 1 is a cross-sectional view illustrating an example of the agricultural film of the present invention. The agricultural film 10 comprises a base material film 12 and a hydrophilic coating film 14 formed on one surface of the base material film 12.

(Base Material Film)

The material for the base material film may be a transparent synthetic resin material such as a polyethylene terephthalate resin, an acrylic resin, a polycarbonate resin, a polyolefin resin, a polyvinyl chloride resin or a fluororesin, and a base material made of a fluororesin is preferred from the viewpoint of the durability, weather resistance, chemical resistance, adhesion to the hydrophilic coating film, etc. The fluororesin is negatively chargeable at its surface, and thus, its adhesion to boehmite particles which are positively charged, becomes high.

The fluororesin may be a homopolymer of a fluoroolefin, a copolymer of two or more fluoroolefins, or a copolymer of at least one fluoroolefin with one or more other monomers.

A fluoroolefin is a monomer having a polymerizable unsaturated bond and fluorine atoms and may further have hydrogen atoms, chlorine atoms, oxygen atoms, etc. As such a fluoroolefin, for example, tetrafluoroethylene, vinyl fluoride, vinylidene fluoride, a perfluoro(alkyl vinyl ether), chlorotrifluoroethylene or hexafluoropropylene is preferred. As the perfluoro(alkyl vinyl ether), perfluoro(propyl vinyl ether) is particularly preferred.

Other monomers are preferably non-fluorinated monomers. For example, olefins such as ethylene, propylene, butene, norbornene, etc.; alkenyl ethers such as cyclohexylmethyl vinyl ether, isobutyl vinyl ether, cyclohexyl vinyl ether, ethyl vinyl ether, 2-ethylhexyl vinyl ether, ethylallyl ether, etc.; and alkenyl esters such as vinyl acetate, vinyl pivalate, vinyl versatate, allyl pivalate, allyl versatate, etc., are preferred.

As fluororesins obtained by polymerizing such monomers, a tetrafluoroethylene/ethylene copolymer, a tetrafluoroethylene/perfluoro(alkyl vinyl ether) copolymer, polyvinyl fluoride, polyvinylidene fluoride, polychlorotrifluoroethylene, a chlorotrifluoroethylene/ethylene copolymer, a vinylidene fluoride/tetrafluoroethylene copolymer, a vinylidene fluoride/hexafluoropropylene copolymer, a tetrafluoroethylene/ hexafluoropropylene copolymer, a vinylidene fluoride/tetrafluoroethylene/hexafluoropropylene copolymer, a tetrafluoroethylene/propylene copolymer and a tetrafluoroethylene/hexafluoropropylene/ethylene copolymer are preferred. Among tetrafluoroethylene/perfluoro(alkyl vinyl ether) copolymers, a tetrafluoroethylene/perfluoro(propyl vinyl ether) copolymer is preferred. Among them, a tetrafluoroethylene/ethylene copolymer is particularly preferred from the viewpoint of the processability and the physical properties of the film to be used.

To the base material film, surface treatment may preliminarily be applied to the surface on which the hydrophilic coating film is to be formed. By applying such surface treatment, wettability of the base material film will be improved, whereby it is possible to improve the adhesion of the hydrophilic coating film to the base material or the uniformity of the hydrophilic coating film. The surface treatment may, for example, be discharge treatment (plasma treatment, corona discharge treatment, etc.), UV treatment, ozone treatment, chemical treatment using an acid, alkali, etc., or physical treatment using an abrasive material.

(Hydrophilic Coating Film)

The hydrophilic coating film is a porous film containing boehmite particles, silica particles and a binder.

It has, heretofore, been known that a porous film containing silica particles exhibits hydrophilicity. However, no study has been made as to how silica particles are influential over the hydrophilicity or porosity, or no quantitative evaluation of the porosity of the coating film has been known to determine how the porosity may be related to the hydrophilicity (such as wettability). Under the circumstances, by quantitatively analyzing the porosity of the hydrophilic coating film from the composition of the hydrophilic coating film, the shape and size of particles constituting the hydrophilic coating film and the pore characteristics of the hydrophilic coating film to make the interrelation between the hydrophilicity (such as wettability) and its durability clear, it has been found that the hydrophilic coating film satisfying all of the following (a) to (c) is able to exhibit the effects of the present invention:

(a) the atomic ratio of Al to Si (Al/Si) is from 0.2 to 5.0, (b) the average particle diameter of the silica particles is from 5 to 50 nm, and (c) the crystallite diameter of the boehmite particles, as calculated from the diffraction peak of the (120) plane, is from 20 to 50 nm.

With respect to (a):

Since the hydrophilic coating film contains Al i.e. positively charged boehmite particles, its adhesion to a base material film, particularly to a fluororesin film, of which the surface charge is likely to be negatively charged, is improved. Thus, when Al/Si is at least 0.2, the adhesion between the hydrophilic coating film and the base material film is improved. Further, when Al/Si is at most 5.0, deterioration of the film strength of the hydrophilic coating film can be suppressed, and the transparency of the hydrophilic coating film is improved. Al/Si is more preferably from 0.4 to 2.1, most preferably from 0.6 to 1.4.

Al/Si can be quantitatively analyzed by a fluorescent X-ray analysis.

With respect to (b):

Silica particles and boehmite particles are charged to have different electric charges and thus are likely to be agglomerated in the coating composition for forming a hydrophilic coating film. By adjusting the average particle diameter of the silica particles and the crystallite diameter of the boehmite particles to be within the above ranges, it is possible to control the agglomeration to a proper level, and consequently, it is possible to form a porous coating film having a large pore volume to exhibit a hydrophilicity (such as wettability) and to form a transparent coating film. When the average particle diameter of the silica particles is from 5 to 50 nm, high hydrophilicity (such as wettability) and transparency can be attained simultaneously. The average particle diameter of the silica particles is preferably from 5 to 30 nm, more preferably from 8 to 15 nm.

The average particle diameter of the silica particles is one obtained by measuring the lengths of the long axes and short axes of 20 silica particles randomly selected among ones in a transmission electron microscopic (TEM) image and averaging them. As mentioned hereinafter, the boehmite particles are particles having a shape of e.g. a plate, and as mentioned hereinafter, the silica particles are particles of e.g. a spherical shape. Therefore, in a TEM image, the boehmite particles and the silica particles which are different in the shape and size, can clearly be distinguished.

(Silica Particles)

The shape of the silica particles may be a spherical shape or a chain shape having spherical particles linked to one another, and a spherical shape is preferred.

The silica particles may be commercially available ones or may be ones obtainable by a known production method.

With respect to (c):

As a coating film excellent in abrasion resistance and hydrophilicity, a coating film is known which contains silica particles having an average particle diameter of from 10 to 30 nm and a nonionic water-soluble organic binder. However, such a coating film has low water resistance and thus has poor hydrophilic durability. It has been found that the water resistance can be improved by incorporating boehmite particles, however, conventional boehmite particles have small particle diameters, whereby the abrasion resistance tends to be deteriorated. Under the circumstance, it has been found that by incorporating boehmite particles having the crystallite diameter of at least 20 nm, the water resistance can be improved without deteriorating the abrasion resistance. It is considered that boehmite particles are aligned in the hydrophilic coating film to improve the abrasion resistance and water resistance. However, if the crystallite diameter of the boehmite particles becomes too large, the stability of the coating composition for forming a hydrophilic coating film tends to be low, and the haze of the hydrophilic coating film tends to be high.

When the crystallite diameter of the boehmite particles, as calculated from the diffraction peak of the (120) plane, is from 20 to 50 nm, high hydrophilicity (such as wettability) and transparency can be attained simultaneously, and the abrasion resistance and hydrophilic durability will also be obtained.

The crystallite diameter of the boehmite particles, as calculated from the diffraction peak of the (120) plane, can be calculated by the X-ray diffraction (XRD) analysis. The crystallite diameter of the boehmite particles is preferably from 30 to 40 nm.

The shape of the boehmite particles may, for example, be a plate-shape, a needle-shape, a fiber-shape or a feather-shape, preferably a plate-shape. When the hydrophilic coating film contains plate-shaped boehmite particles, crystal alignment will be obtained, whereby adhesion of the hydrophilic coating film to the base material is further improved, the abrasion resistance will be maintained for a long period of time, and the hydrophilic coating film can sufficiently follow a flexible base material (such as a film).

The boehmite particles may be commercially available ones or may be ones obtainable by a known production method. A method for producing boehmite particles may, for example, be a method wherein an alkali metal aluminate and an acidic aluminum salt (such as aluminum chloride, aluminum nitrate or aluminum sulfate), and, if required, an acidic solution, are mixed to obtain a hydrated gel, which is aged and then deflocculated by adding an acid; a method wherein an acidic aluminum salt is ion-exchanged to obtain a hydrated gel, which is aged and then deflocculated; or a method wherein an aluminum alkoxide is hydrolyzed and then deflocculated.

The thickness of the hydrophilic coating film is preferably from 100 to 700 nm, more preferably from 250 to 450 nm. When the thickness of the hydrophilic coating film is at least 100 nm, it is possible to suppress deterioration of the hydrophilicity and hydrophilic durability. When the thickness of the hydrophilic coating film is at most 700 nm, the hydrophilic coating film is less susceptible to cracking, interference fringe is less likely to occur, and even if scratched, such a scratch mark is unnoticeable.

In the hydrophilic coating film of the agricultural film, the total pore volume of pores having diameters of from 1 to 60 nm is preferably from 1.0 to 20.0 $[\times 10^{-4} \text{ cc/g}]$, more preferably from 2.0 to 10.0 $[\times 10^{-4} \text{ cc/g}]$. When the total pore volume is at least 1.0 $[\times 10^{-4} \text{ cc/g}]$, the porosity of the hydrophilic coating film becomes high, water can be sufficiently adsorbed, and hydrophilicity (such as wettability) can sufficiently be obtainable. Further, even if a part of the hydrophilic coating film decreases as the time passes, the hydrophilicity (such as wettability) can be maintained, and consequently, the hydrophilic durability will be good. When the total pore volume is at most 20.0 $[\times 10^{-4} \text{ cc/g}]$, deterioration of the abrasion resistance can be suppressed, and the haze value is less likely to be increased.

The total pore volume can be measured by a nitrogen adsorption pore measurement. Heretofore, there have been many cases wherein a pore volume of a powder is measured. However, in the present invention, the pore volume of the hydrophilic coating film is substantially influential over the hydrophilicity (such as wettability), and if the hydrophilic coating film is scraped to form a powder, there is a problem such that the pore volume of the essential hydrophilic coating film cannot be measured. Therefore, in the present invention, a technique has been established anew wherein the hydrophilic coating film on the base material film is measured as it is including the base material film.

When a nitrogen adsorption pore measurement is carried out including the base material film, if the nitrogen adsorption of the base material film is large, the adsorption amount to the base material film becomes so large that there may be a case where the pore volume of the essential hydrophilic coating film cannot accurately be measured. However, in a case where the base material film is a fluororesin film, the nitrogen adsorption amount of the base material film is so small that it can be negligible as compared with the adsorption amount of the hydrophilic coating film, and therefore, the pore volume of the hydrophilic coating film can be evaluated by the measurement including the base material film. Also in the case of a film made of another synthetic resin, if the film has a small nitrogen adsorption, the measurement can be made in the same manner as in the case of the fluororesin film.

The hydrophilic coating film is required to have transparency. The transparency of the hydrophilic coating film can be evaluated by its haze value. The haze value of the hydrophilic coating film is preferably at most 5.0%, more preferably at most 3.0%. When the haze value is at most 5.0%, the hydrophilic coating film can be regarded as having sufficient transparency as an agricultural film.

The haze value of the hydrophilic coating film can be calculated by subtracting the haze value of the base material film from the haze value of the agricultural film.

The hydrophilicity of the hydrophilic coating film can be evaluated by its contact angle to water. The contact angle of the hydrophilic coating film to water is preferably at most 40°, more preferably at most 20°, further preferably at most 10°. When the contact angle is at most 40°, the hydrophilicity of the hydrophilic coating film becomes sufficient, and the wettability can easily be obtainable. If soil is deposited on the surface of the hydrophilic coating film, the contact angle to water may increase, and the wettability may be lost in many cases. In the case of the hydrophilic coating film in the present invention, the surface is gradually washed out and renewed, whereby the wettability can be maintained for a long period of time.

(Binder)

The hydrophilic coating film contains a binder, whereby the film forming property and abrasion resistance of the hydrophilic coating film are improved.

As such a binder, an organic binder or an inorganic binder (such as a metal oxide) may be mentioned, and an organic binder is preferred. Further, the binder is preferably a hydrophilic binder. If a hydrophobic binder is used, the contact angle of the hydrophilic coating film to water may increase, whereby the hydrophilicity may decrease. Further, since the hydrophilic coating film is preferably formed from an aqueous coating composition, the binder is particularly preferably a water-soluble hydrophilic binder. As such a water-soluble hydrophilic binder, a nonionic water-soluble organic binder is more preferred. As compared with an ionic water-soluble organic binder, a nonionic water-soluble organic binder brings about no substantial agglomeration of inorganic particles whereby the storage stability of the liquid is high. As such a nonionic water-soluble organic binder, polyethylene glycol, polyvinyl alcohol, a modified polyvinyl alcohol or a water-soluble cellulose derivative may, for example, be mentioned.

Here, in the present invention, the modified polyvinyl alcohol means one having some of hydroxy groups in a polyvinyl alcohol changed to another group. For example, it may be one having the hydroxy groups esterified by e.g. a carboxylic acid (excluding acetic acid), one having the hydroxy groups formal-modified by an aldehyde, one having the hydroxy groups alkyl-etherified, or the like. As the modified polyvinyl alcohol, a modified product having a reactive group introduced to some of hydroxy groups, is preferred. For example, a modified polyvinyl alcohol (tradename: Gohsefimer Z100) used in Examples is a modified polyvinyl alcohol having an acetoacetyl group introduced to some of hydroxy groups.

Further, as the binder, for the following reasons, polyvinyl alcohol and a modified polyvinyl alcohol (hereinafter these may generally be referred to as a water-soluble polyvinyl alcohol) are preferred. It is possible to use, as the binder, a combination of a plurality of water-soluble polyvinyl alcohols of different types in e.g. the saponification degree, molecular weight, modification, etc.

When the hydrophilic coating film contains a water-soluble polyvinyl alcohol, the pore characteristics of the hydrophilic coating film will be good, it becomes possible to simultaneously attain high hydrophilicity (such as wettability) and transparency and to impart abrasion resistance, and further, the uniform forming property of the hydrophilic coating film will be excellent. Further, as compared with a case where polyethylene glycol is used as the water-soluble binder, the adhesion to the base material is improved, and the abrasion resistance tends to be good, and accordingly, by using such a water-soluble polyvinyl alcohol, the abrasion resistance can be improved by its addition in a small amount.

Whether or not the hydrophilic coating film contains a water-soluble polyvinyl alcohol can be ascertained by a $^1$H-NMR analysis. A sample liquid for measurement may be prepared in such a manner that from the base material film, the hydrophilic coating film is scraped to recover a powder sample, which is diluted with water to 5 mass %, followed by dispersion treatment by an ultrasonic dispersing apparatus for 30 minutes to obtain a dispersion, which is subjected to centrifugal separation to a supernatant and a precipitate, whereupon the supernatant is concentrated.

As the inorganic binder, a precursor for a metal oxide may be mentioned, and a precursor for silica or alumina is preferred. The precursor for silica or alumina is obtainable by a known production method.

The silica precursor may be one obtained by a method of hydrolyzing a silicic acid alkoxide (such as ethyl silicate); one obtained by a method of decomposing an alkali metal silicate with an acid, followed by electrolytic dialysis; one obtained by a method of deflocculating an alkali metal silicate; or one obtained by a method of dialyzing an alkali metal silicate by an ion exchange resin.

The alumina precursor may, for example, be one obtained by a method of hydrolyzing an aluminum alkoxide; or a water-soluble aluminum salt or an aluminum chelate compound.

The proportion of the binder in the hydrophilic coating film is preferably from 0.5 to 15 parts by mass, more preferably from 3 to 10 parts by mass, per 100 parts by mass in total of the boehmite particles and the silica particles. When the binder is at most 15 parts by mass, pores of the hydrophilic coating film are less likely to be embedded by the binder, whereby a large pore volume can be obtained. When the binder is at least 0.5 part by mass, the effect to improve the abrasion resistance can readily be obtainable.

(Other Components)

In addition to the boehmite particles and the silica particles, the hydrophilic coating film may contain other additives such as metal oxide particles, a surfactant, a defoaming agent, a crosslinking agent, a water resistant curing agent, a coloring dye, a pigment, an ultraviolet absorber, an antioxidant, etc., as the case requires. The total amount of other components to constitute a solid content is preferably at most 50 parts by mass, more preferably at most 30 parts by mass, per 100 parts by mass in total of the boehmite particles and the silica particles. If the total amount of other components to constitute a solid content becomes too large, the properties obtainable by the essential components may be deteriorated.

The hydrophilic coating film may contain metal oxide particles other than the boehmite particles and the silica particles, as the case requires. For example, in a case where cerium oxide particles are contained, an ultraviolet shielding function may be imparted. In a case where titanium oxide particles are contained, an ultraviolet shielding performance or a photocatalytic performance may be imparted. In a case where indium-doped tin oxide (ITO) particles, antimony-doped tin oxide (ATO) particles or tin oxide particles are contained, electroconductivity or an ultraviolet shielding performance may be imparted. In a case where alumina particles other than boehmite particles are contained, the hydrophilicity (such as wettability) or the film strength of the hydrophilic coating film may be further improved.

The average particle diameter of the metal oxide particles is preferably from 1 to 500 nm, more preferably from 1 to 200 nm. When the average particle diameter of the metal oxide particles is at least 1 nm, the properties of the metal oxide particles can readily be obtainable. When the average particle diameter of the metal oxide particles is at most 500 nm, deterioration of the transparency of the hydrophilic coating film can be suppressed.

The proportion of the metal oxide particles is preferably at most 30 parts by mass, per 100 parts by mass in total of the boehmite particles and the silica particles. In order to obtain the above-mentioned properties by using the metal oxide particles, their amount is preferably at least 1 part by mass per 100 parts by mass in total of the boehmite particles and the silica particles.

In a case where the coating composition for forming the hydrophilic coating film (hereinafter referred to simply as the coating composition) contains a surfactant, the coating property of the coating composition will be improved, whereby a uniform hydrophilic coating film having a good appearance can be formed, and the hydrophilicity of the hydrophilic coating film is also improved. By incorporating a surfactant to the coating composition, the surfactant will consequently be contained in the hydrophilic coating film.

The surfactant may be an anionic surfactant, a cationic surfactant, an amphoteric surfactant or a nonionic surfactant. Such a surfactant may be a surfactant having hydrogen atoms of an alkyl group moiety substituted by fluorine atom (i.e. a fluorinated surfactant). As the surfactant, a nonionic surfactant is preferred in that the dispersion stability of the boehmite particles and the silica particles in the coating composition for forming a hydrophilic coating film will thereby be good.

The nonionic surfactant is preferably a compound having at least one type of structural unit selected from the group consisting of —$CH_2CH_2CH_2O$—, —$CH_2CH_2O$—, —$SO_2$—, —NR— (wherein R is a hydrogen atom or an organic group), —$NH_2$, —$SO_3Y$ and —COOY (wherein Y is a hydrogen atom, a sodium atom, a potassium atom or an ammonium group). Such a compound may, for example, be an alkylpolyoxyethylene ether, an alkylpolyoxyethylene-polyoxypropylene ether, a fatty acid polyoxyethylene ester, a fatty acid polyoxyethylene sorbitane ester, a fatty acid polyoxyethylene sorbitol ester, an alkylpolyoxyethyleneamine, an alkylpolyoxyethyleneamide or a polyether-modified silicone surfactant.

The proportion of the surfactant in the coating composition for forming a hydrophilic coating film is preferably at most 15 parts by mass, more preferably at most 10 parts by mass, per 100 parts by mass in total of the boehmite particles and the silica particles. When the surfactant is at most 15 parts by mass, deterioration of the abrasion resistance of the hydrophilic coating film can be suppressed. In order to obtain the above-described properties by using the surfactant, its amount is preferably at least 1 part by mass per 100 parts by mass in total of the boehmite particles and the silica particles.

The crosslinking agent for the binder may, for example, be an inorganic compound such as an inorganic aluminum compound, an inorganic boron compound, an inorganic zirconium compound or an inorganic titanium compound, or an organic compound such as glyoxal, a hydrazide compound or an isocyanate compound. By crosslinking the binder by using such a crosslinking agent, it is possible to suppress deterioration of the abrasion resistance of the hydrophilic coating film and to improve the durability of wettability. The proportion of the crosslinking agent in the coating composition for forming a hydrophilic coating film is preferably at most 10 parts by mass, more preferably at most 5 parts by mass, per 100 parts by mass in total of the boehmite particles and the silica particles. When the crosslinking agent is at most 10 parts by mass, the stability of the coating liquid can be obtained, and it is possible to suppress an increase of the haze of the hydrophilic coating film. In order to obtain the above-described properties by using the crosslinking agent, its amount is preferably at least 0.1 part by mass per 100 parts by mass in total of the boehmite particles and the silica particles.

The water resistant curing agent may, for example, be an aqueous emulsion, aqueous dispersion or the like, of an acrylic resin, a polyester resin, a polyolefin resin, an urethane resin or a vinyl acetate resin.

(Method for Forming Hydrophilic Coating Film)

The hydrophilic coating film is formed by applying the coating composition for forming a hydrophilic coating film comprising the boehmite particles, the silica particles, the binder and water, on a surface of the base material film, followed by drying.

The coating method may, for example, be brush coating, roller coating, manual coating, spin coating, dip coating, coating by various printing systems, bar coating, curtain flow coating, die coating, flow coating or spray coating. Coating by means of a gravure coater is preferred, since it is thereby possible to carry out uniform coating over a large area.

For the purpose of improving the film strength of the hydrophilic coating film, heating or irradiation with ultraviolet rays, electron rays, etc. may be carried out. The heating temperature may be decided taking into consideration the heat resistance of the base material film. For example, in the case of a fluororesin film, the heating temperature is preferably from 40 to 100° C.

(Coating Composition for Forming Hydrophilic Coating Film)

The coating composition for forming a hydrophilic coating film can be prepared by mixing a boehmite sol containing boehmite particles, a silica sol containing silica particles and a binder. At the time of preparing the coating composition for forming a hydrophilic coating film, water or an organic solvent (such as ethanol or methanol) may be added, as the case requires.

The boehmite sol is one having boehmite particles dispersed in water, a mixed solvent of water and a water-soluble organic solvent, or another aqueous medium. The water-soluble organic solvent is preferably a water-soluble alcohol such as ethanol, methanol or isopropanol. The solid content concentration of the boehmite sol is preferably from 0.1 to 30 mass %, more preferably from 3 to 20 mass %.

In order to stabilize the boehmite particles in the dispersion medium, the boehmite sol preferably contains anions derived from an inorganic acid or organic acid (such as chlorine ions, sulfate ions or acetate ions). The concentration of anions is preferably at most 35 parts by mass per 100 parts by mass of Al. When the concentration of anions is at most 35 parts b mass, it is possible to suppress deterioration of the water resistance or hydrophilicity of the hydrophilic coating film. In a case where the concentration of anions in the boehmite sol is high, it is preferred to reduce the anion concentration by means of an ion exchange resin, electrical dialysis, ultrafiltration or the like.

The pH of the boehmite sol is preferably from 4 to 6.8, since it is thereby possible to obtain a coating film excellent in the water resistance and transparency. When the pH is at least 4, the anions may not be too much, and the water resistance of the hydrophilic coating film will be good. When the pH is at most 6.8, the boehmite particles are less likely to be agglomerated, and it is possible to secure the transparency of the hydrophilic coating film and the adhesion to the base material and to suppress deterioration of the abrasion resistance.

The solid content concentration of the silica sol is preferably from 5 to 40 mass %, more preferably from 10 to 35 mass %. The pH of the silica sol is preferably from 9 to 10.5 from the viewpoint of the stability. It is also possible to use a silica sol having a pH of at most 7, or it is also possible to adjust the pH to be at most 7 before mixing a silica sol having a pH of from 9 to 10.5 with the boehmite sol.

As mentioned-above, the pH of the coating composition for forming a hydrophilic coating film of the present invention is preferably from 2.5 to 7. Even if a silica sol having a pH of from 9 to 10.5 is used, the pH of the coating composition for forming a hydrophilic coating film can be made to be from 2.5 to 7 by mixing it with a boehmite sol having a low pH. Otherwise, as the case requires, after mixing with the boehmite sol, etc., the pH of the composition may be adjusted to a level of from 2.5 to 7. The adjustment of the pH of the composition is preferably carried out by adding an inorganic acid such as nitric acid.

The coating composition for forming a hydrophilic coating film comprises the boehmite particles, the silica particles, the binder and water and may further contain, as the case requires, an organic solvent, a surfactant, metal oxide particles other than the boehmite particles and the silica particles, an additive, etc.

The solid content concentration of the coating composition for forming a hydrophilic coating film is preferably from 0.1 to 20 mass %, more preferably from 0.1 to 10 mass %. When the solid content concentration is at least 0.1 mass %, non-uniformity is less likely to occur when the coating composition for forming a hydrophilic coating film is applied to the surface of the base material, and the performance of hydrophilicity, etc. becomes easily obtainable. When the solid content concentration is at most 20 mass %, the operation efficiency at the time of coating will be good, deterioration of the transparency of the hydrophilic coating film is suppressed, and further, the storage stability of the coating composition for forming a hydrophilic coating film will be good. Such a solid content concentration is preferably from 1 to 15 mass %, more preferably from 3 to 10 mass %.

The pH of the coating composition for forming a hydrophilic coating film is preferably from 2.5 to 7, more preferably from 3.5 to 7, further preferably from 4 to 6. When the pH is at least 2.5, dissolution of the boehmite particles can be prevented. When the pH is at most 7, the dispersion stability of the silica particles and the boehmite particles will be good.

The proportion of the silica particles is from 20 to 80 mass %, preferably from 40 to 60 mass %, based on the total amount of the boehmite particles and the silica particles. When the silica particles are at least 20 mass %, deterioration of the film strength of the hydrophilic coating film can be suppressed. When the silica particles are at most 80 mass %, the adhesion to the base material and the hydrophilicity of the hydrophilic coating film will be good.

The proportion of the binder is from 0.5 to 15 parts by mass, preferably from 1 to 5 parts by mass, per 100 parts by mass in total of the boehmite particles and the silica particles. When the binder is at most 15 parts by mass, the pores of the hydrophilic coating film are less likely to be embedded by the binder, and a large pore volume can be obtained. When the binder is at least 0.5 part by mass, the effect to improve the abrasion resistance is readily obtainable.

In the coating composition for forming a hydrophilic coating film, water plays a role as a dispersion medium to disperse the boehmite particles and the silica particles.

The proportion of water is preferably from 500 to 100,000 parts by mass, more preferably from 600 to 10,000 parts by mass, further preferably from 1,000 to 3,000 parts by mass, per 100 parts by mass of the total solid content in the coating composition for forming a hydrophilic coating film. When the water is at least 500 parts by mass, the concentration of the coating composition for forming a hydrophilic coating film is not too high, and the storage stability will be good. When the water is at most 100,000 parts by mass, the concentration of the coating composition for forming a hydrophilic coating film is not too low, and it is possible to form a hydrophilic coating film having an adequate thickness.

The coating composition for forming a hydrophilic coating film may contain an organic solvent within a range not to impair the dispersion stability of the boehmite particles and the silica particles. As such an organic solvent, a water-soluble organic solvent is preferred, and as its amount, it is preferred to use an amount of at most its solubility in water. Further, the boiling point of the organic solvent is preferably at most 120° C., particularly preferably at most 100° C.

As such an organic solvent, a water-soluble alcohol may be mentioned such as methanol, ethanol, n-propanol, isopropanol, n-butanol, isobutanol, sec-butanol, t-butanol or ethylene glycol.

In order to obtain a defoaming property at the time of coating a base material with the coating composition for forming a hydrophilic coating film, it is preferred to incorporate a water-soluble organic solvent. As such a water-soluble organic solvent, a water-soluble alcohol is preferred which may be mixed at an optional proportion with water. In such a case, the amount of the alcohol is preferably adjusted so that the proportion of the alcohol will be from 10 to 70 mass % based on the total amount of water and the alcohol. When the alcohol is at least 10 mass %, a defoaming effect can be obtained, and when the alcohol is at most 70 mass %, the stability of the coating composition for forming a hydrophilic coating film is good. As such a water-soluble alcohol, methanol, ethanol or isopropanol is preferred from the viewpoint of the stability. Such alcohols may be used alone, or two or more of them may be used in combination. The proportion of the alcohol based on the total amount of water and the alcohol is more preferably from 30 to 60 mass %.

(Other Films)

In the agricultural film of the present invention, in a case where the hydrophilic coating film is formed only on one side of the base material film, an anti-fouling film, an anti-static film, a heat-shielding film, an ultraviolet shielding film or the like may be formed on the other side.

In the agricultural film of the present invention as described above, the hydrophilic coating film formed on the base material film is a porous hydrophilic coating film which contains boehmite particles, silica particles and a binder and which satisfies the above (a) to (c), whereby the hydrophilic coating film becomes one having high transparency and being excellent in the abrasion resistance (adhesion), the hydrophilicity (anti-fogging property, wettability and anti-fouling property) and the hydrophilic durability.

EXAMPLES

Now, Examples will be described.

Examples 1 to 3, 8 to 10, 12, 13 and 15 to 17 are Working Examples of the present invention, and Examples 4 to 7, 11, 14 and 18 to 20 are Comparative Examples.

As the base material for the agricultural film, one having corona discharge treatment applied on one side of a tetrafluoroethylene/ethylene copolymer film (tradename: Aflex manufactured by Asahi Glass Company, Limited, thickness: 100 μm) was used (hereinafter referred to as an ETFE film). The hydrophilic coating film was formed on the side of the ETFE film subjected to corona discharge treatment (surface wetting index after the corona discharge treatment: 42).

[Al/Si]

A sample was cut out from the agricultural film, and with respect to such a-sample, a fluorescent X-ray analysis of the hydrophilic coating film including the base material film was carried out, and the deposited amounts of Si and Al (µg/cm$^2$) were calculated, whereupon Al/Si (atomic ratio) was calculated.

(Fluorescent X-ray apparatus) Model: RIX3000 manufactured by Rigaku Corporation.

(Measuring method) Thin film FP method.

(Calculation method for deposited amount) Non standard quantitative determination.

(Excitation conditions) Target: Rh, tube voltage (KV): 50, tube current (mA): 50.

(Optical system conditions) Dispersive crystal: PET, detector: PC.

(PHA condition) 100 to 300

(Scanning conditions) Scanning method: step scan, step: 0.050 deg, measuring time: 0.40 sec.

(Peak of Al) 144.610 deg.

(Peak of Si) 109.040 deg.

[Average Particle Diameter of Silica Particles]

A powder sample recovered by scraping the hydrophilic coating film from the base material film was diluted to 5 mass % with water and subjected to dispersion treatment by an ultrasonic dispersing apparatus for 30 minutes to obtain a dispersion. Such a dispersion was diluted with water to obtain a diluted liquid having a solid content concentration of about 0.1 mass %, and then, such a diluted liquid was dropped on a collodion film and dried to form an observation film. Such an observation film was observed by TEM, and the lengths of the long axes and short axes of 20 silica particles randomly selected among ones in the TEM image were measured, and they were averaged to obtain an average particle diameter of the silica particles.

(TEM) Model: JEM-1230, manufactured by JEOL Ltd.

[Crystallite Diameter of Boehmite Particles]

With respect to a powder sample recovered by scraping the hydrophilic coating film from the base material film, the XRD analysis was carried out twice, and the crystallite diameter was calculated from the diffraction peak of the (120) plane of the boehmite particles.

(XRD apparatus) Model: TTR-III manufactured by Rigaku Corporation (Measuring conditions) X-ray output: 50 kV-300 mA, optical system: parallel beam, scan speed: 2°/min, rotation: yes (100 RPM), sampling interval: 0.02°/step (Analytical conditions) Software: JADE7, correction standard: Si powder (NIST SRM640c), analytical peak: boehmite (120) plane, fitting function: Pearson-VII, exponent: 1.5, baseline: fourth ordered polynominal

[Thickness of Hydrophilic Coating Film]

An agricultural film was cut by a razor, and the cut surface was observed by a scanning electron microscope (SEM), whereby the thicknesses at three portions of the hydrophilic coating film were measured, and they were averaged.

(SEM) Model: S-4300 manufactured by Hitachi, Ltd.

(Measuring conditions) Accelerating voltage: 5 kV, conductive coating: Pt [Total Pore Volume]

An agricultural film was cut into a size of about 8 mm×30 mm by a cutter, and about 2.5 g of the cutout sample was sealed in a sample cell made of glass. Then, by nitrogen adsorption pore measurement, the total pore volume within a range of a pore diameter of from 1 to 60 nm was measured.

(Apparatus) Model: Autosorb MP-1 manufactured by Quantachrome Instruments (Measuring conditions) Nitrogen adsorption method, nitrogen relative pressure: 0.0001 to 0.990

(Method for analysis) NLDFT method

[Appearance]

The appearance of the hydrophilic coating film of an agricultural film was visually evaluated, whereby one free from foreign matter defects, warpage, cracking or non-uniformity was designated by ○ (good), and one having any one of such defects was designated by X (no good).

[Haze Value]

In accordance with JIS K7105, the haze values of an agricultural film and a base material film were measured by means of a haze computer (model: HGM-3DP manufactured by Suga Test Instruments Co., Ltd.), and the haze value of the hydrophilic coating film was calculated by subtracting the haze value of the base material film from the haze value of the agricultural film.

One having a haze value of at most 5% was regarded as acceptable, and one having a haze value exceeding 5% was regarded as unacceptable.

[Transmittance]

In accordance with JIS K7105 (1981), the total light transmittance of an agricultural film was measured by means of a haze meter (model: HGM-2K, SM color computer model SM-5, manufactured by Suga Test Instruments Co., Ltd.).

[Contact Angle]

The contact angles of the hydrophilic coating film of an agricultural film to water were measured at optional five different portions by means of a contact angle meter (model: CA-X150 manufactured by Kyowa Interface Science Co., LTD.), and they were averaged. The contact angle serves as an index for the hydrophilicity.

[Low Temperature Wettability]

From an agricultural film, a sample of 14 cm×8 cm was cutout. A roof-form frame made of an acrylic resin was set at an angle of 15° to a horizontal plane, on a constant temperature water tank set in a constant temperature environment test room, and the sample was set on the frame so that the hydrophilic coating film faced down. The environment test room was adjusted to be 10° C., and the constant temperature water tank was adjusted to be 20° C. The state of water droplets on the surface of the hydrophilic coating film was observed and evaluated by the following standards. ◉, ○ and Δ are regarded as acceptable, and X and X X are regarded as unacceptable.

◉ (excellent): After one hour from initiation of evaluation, the film surface is uniformly wet.

○ (good): After two hours from initiation of evaluation, the film surface is uniformly wet.

Δ (permissible): After 3 hours from initiation of evaluation, the film surface is uniformly wet.

X (not permissible): After 3 hours from initiation of evaluation, water droplet-deposited portions are partially observed on the film surface.

X X (bad): After 3 hours from initiation of evaluation, water droplets are deposited and white fogging is observed over the entire film surface.

[Durability of Wettability]

A sample was set in the same environment test room as for the evaluation of the low temperature wettability, and left to stand for three months while maintaining the environment test room at 20° C. and the constant temperature water tank at 80° C. Upon expiration of the three months, the sample was taken out. Then, with respect to such a sample, evaluation of the low temperature wettability was carried out, whereby the state of water droplets on the surface of the hydrophilic coating film was observed, and the durability of wettability was evaluated by the same standards as for the evaluation of the low temperature wettability.

In an agricultural house, in a winter time, early in the morning or evening when outside air temperature is low, an agricultural film is likely to have fogging, and suppression of fogging is required for the agricultural film. For such suppression of fogging, "low temperature wettability" will be an index. Further, an agricultural film is required to show wettability even after exposure for a long period of time, and for this purpose, "durability of wettability" will be an index.

[Abrasion Resistance]

A sample of an agricultural film was set in a flat surface abrasion tester (model: TESTER SANGYO AB-301 COLOR FASTNESS RUBBING TESTER, manufactured by Coating Tester Kougyo, Inc.), and BEMCOT (tradename: BEMCOT M-1, manufactured by Asahi Chemical Industry Co., Ltd.) was attached as an abrading material, whereupon an abrasion test of the hydrophilic coating film was carried out under such conditions that the load was 200 g, the contact area was 15 mm×20 mm and the number of abrasion was one reciprocation, whereby the Al-deposited amounts (μg/cm$^2$) before and after the test were measured by a fluorescent X-ray apparatus (model: RIX3000 manufactured by Rigaku Corporation), and the abrasion resistance was evaluated by Al-deposited amount after the test/initial Al-deposited amount×100(%). One wherein the Al-deposited amount was at least 70% to the initial Al-deposited amount, was regarded as acceptable.

Example 1

To 792 g of ion-exchanged water, 8 g of 1N nitric acid was added, then 200 g of boehmite (tradename: DISPAL11N7-80 manufactured by SASOL Ltd.) was added with stirring, and after continuing the stirring for 30 minutes, the system was left to stand at room temperature for one day, to obtain a boehmite dispersion having a solid content concentration of 20 mass % and a pH of 5.0.

To 100 g of the boehmite dispersion, 81.8 g of silica sol (tradename: SNOWTEX OS manufactured by Nissan Chemical Industries, Ltd., solid content concentration: 20 mass %, pH: 3.0), 315.4 g of industrial ethanol (tradename: SOLMIX AP-1 manufactured by Japan Alcohol Trading Company Limited), 29.1 g of an aqueous solution containing 5 mass % of polyvinyl alcohol (tradename: PVA105 manufactured by Kuraray Co., Ltd., saponification degree: 98 to 99 mol %, polymerization degree: 500) and 104.5 g of ion-exchanged water were added with stirring, followed by stirring for 5 minutes, to obtain a coating composition for forming a hydrophilic coating film comprising, by a solid content ratio, 55 parts by mass of boehmite, 45 parts by mass of silica and 4 parts by mass polyvinyl alcohol and having a solid content concentration of 6 mass % and a pH of 4.1. 2 mL of the above coating composition was applied to the surface of an ETFE film having A4 size by a bar coater and then dried at 80° C. for 5 minutes to form a hydrophilic coating film having a thickness of 0.35 μm thereby to obtain an agricultural film. With respect to such an agricultural film, the above evaluations were carried out. The evaluation results are shown in Table 1.

Example 2

A coating composition for forming a hydrophilic coating film having pH 4.5 was obtained in the same manner as in Example 1 except that as the boehmite, tradename: DISPAL 10F4 manufactured by SASOL Ltd. was used instead of tradename: DISPAL 11N7-80 manufactured by SASOL Ltd., and instead of the polyvinyl alcohol (tradename: PVA105 manufactured by Kuraray Co., Ltd.), a modified polyvinyl alcohol (tradename: Gohsefimer Z100 manufactured by Nippon Synthetic Chemical Industry Co., Ltd.) was used. Further, by using such a coating composition, an agricultural film was obtained in the same manner as in Example 1.

With respect to such an agricultural film, the above evaluations were carried out. The evaluation results are shown in Table 1.

Example 3

A boehmite dispersion was obtained in the same manner as in Example 1.

To 100 g of the boehmite dispersion, 66.7 g of silica sol (tradename: Organosilica sol IPA-ST manufactured by Nissan Chemical Industries, Ltd., solid content concentration: 30 mass %), 56 g of an aqueous solution containing 10 mass % of polyethylene glycol (PEG2000, molecular weight: 2000), 0.8 g of a surfactant (tradename: SN Wet L manufactured by San Nopco Limited), 280 g of ion-exchanged water and 270 g of industrial ethanol (tradename: SOLMIX AP-1 manufactured by Japan Alcohol Trading Company Limited) were added with stirring, followed by stirring for 5 minutes, to obtain a coating composition for forming a hydrophilic coating film comprising, by a solid content ratio, 50 parts by mass of boehmite, 50 parts by mass of silica, 14 parts by mass of PEG2000 and 2 parts by mass of the surfactant and having a solid content concentration of 6 mass % and a pH of 5.5. Further, by using such a coating composition, an agricultural film was obtained in the same manner as in Example 1.

With respect to such an agricultural film, the above evaluations were carried out. The evaluation results are shown in Table 1.

Example 4

Comparative Example

A coating composition for forming a hydrophilic coating film was produced in the same manner as in Example 1 except that as the boehmite, tradename: DISPAL 18N4-80 manufactured by SASOL Ltd. was used instead of tradename: DISPAL 11N7-80 manufactured by SASOL Ltd., and further, by using such a coating composition, an agricultural film was obtained in the same manner as in Example 1.

With respect to such an agricultural film, the above evaluations were carried out. The evaluation results are shown in Table 1.

Example 5

Comparative Example

An agricultural film was obtained in the same manner as in Example 1 except that the amount of the boehmite dispersion was changed to 163.6 g, and the amount of the silica sol was changed to 18.2 g.

With respect to such an agricultural film, the above evaluations were carried out. The evaluation results are shown in Table 1.

Example 6

Comparative Example

An agricultural film was obtained in the same manner as in Example 1 except that the amount of the boehmite dispersion was changed to 18.2 g, and the amount of the silica sol was changed to 163.6 g.

With respect to such an agricultural film, the above evaluations were carried out. The evaluation results are shown in Table 1.

Example 7

Comparative Example

To 800 g of ion-exchanged water, 200 g of boehmite (tradename: DISPAL 18N4-80 manufactured by SASOL Ltd.) was added with stirring, and after continuing the stirring for 30 minutes, the system was left to stand at room temperature for one day, to obtain a boehmite dispersion having a solid content concentration of 20 mass % and a pH of 3.6.

To 19.0 g of the boehmite dispersion, 10.3 g of silica sol (tradename: SNOWTEX S manufactured by Nissan Chemical Industries, Ltd., solid content concentration: 30 mass %, pH: 10), 50.0 g of industrial ethanol (tradename: SOLMIX AP-1 manufactured by Japan Alcohol Trading Company Limited), 1.5 g of 1N nitric acid, 6.0 g of an aqueous solution containing 7 mass % of polyvinyl alcohol (tradename: PVA105 manufactured by Kuraray Co., Ltd., saponification degree: 98 to 99 mol %, polymerization degree: 500), and 18.9 g of ion-exchanged water were added with stirring, followed by stirring for 5 minutes, to obtain a coating composition for forming a hydrophilic coating film comprising, by a solid content ratio, 55 parts by mass of boehmite, 45 parts by mass of silica and 6 parts by mass of polyvinyl alcohol and having a solid content concentration of 7 mass % and pH 5.0.

An agricultural film was obtained in the same manner as in Example 1 except that such a coating composition was used.

With respect to such an agricultural film, the above evaluations were carried out, and the evaluation results are shown in Table 1.

Example 8

To 800 g of ion-exchanged water, 200 g of boehmite (tradename: DISPAL 14N4-80 manufactured by SASOL Ltd.) was added with stirring, and after continuing the stirring for 30 minutes, the system was left to stand at room temperature for one day, to obtain a boehmite dispersion having a solid content concentration of 20 mass % and a pH of 4.0.

To 19.0 g of the boehmite dispersion, 10.3 g of silica sol (tradename: SNOWTEX S manufactured by Nissan Chemical Industries, Ltd., solid content concentration: 30 mass %, pH: 10), 50.0 g of industrial ethanol (tradename: SOLMIX AP-1 manufactured by Japan Alcohol Trading Company Limited), 1.5 g of 1N nitric acid, 6.0 g of an aqueous solution containing 7 mass % of polyvinyl alcohol (tradename: PVA105 manufactured by Kuraray Co., Ltd., saponification degree: 98 to 99 mol %, polymerization degree: 500), and 19.0 g of ion-exchanged water were added with stirring, followed by stirring for 5 minutes, to obtain a coating composition for forming a hydrophilic coating film comprising, by a solid content ratio, 55 parts by mass of boehmite, 45 parts by mass of silica and 6 parts by mass of polyvinyl alcohol and having a solid content concentration of 7 mass % and pH 5.1.

An agricultural film was obtained in the same manner as in Example 1 except that such a coating composition was used. With respect to such an agricultural film, the above evaluations were carried out, and the evaluation results are shown in Table 1.

Example 9

To 800 g of ion-exchanged water, 200 g of boehmite (tradename: DISPAL 11N7-80 manufactured by SASOL Ltd.) was added with stirring, and after continuing the stirring for 30 minutes, the system was left to stand at room temperature for one day, to obtain a boehmite dispersion having a solid content concentration of 20 mass % and a pH of 5.3.

To 19.0 g of the boehmite dispersion, 10.3 g of silica sol (tradename: SNOWTEX S manufactured by Nissan Chemical Industries, Ltd., solid content concentration: 30 mass %, pH: 10), 50.0 g of industrial ethanol (tradename: SOLMIX AP-1 manufactured by Japan Alcohol Trading Company Limited), 1.5 g of 1N nitric acid, 4.0 g of an aqueous solution containing 7 mass % of modified polyvinyl alcohol (tradename: Gohsefimer Z100 manufactured by Nippon Synthetic Chemical Industry Co., Ltd.), 1.0 g of an aqueous solution containing 10% of zirconium oxychloride octahydrate, 19.0 g of ion-exchanged water and 1.0 g of an aqueous solution containing 10 mass % of a surfactant (tradename: SN Wet L manufactured by San Nopco Limited) were added with stirring, followed by stirring for 5 minutes, to obtain a coating composition for forming a hydrophilic coating film comprising, by a solid content ratio, 55 parts by mass of boehmite, 45 parts by mass of silica and 4 parts by mass of polyvinyl alcohol and having a solid content concentration of 7 mass % and pH 5.8.

An agricultural film was obtained in the same manner as in Example 1 except that such a coating composition was used. With respect to such an agricultural film, the above evaluations were carried out, and the evaluation results are shown in Table 1.

Example 10

To 800 g of ion-exchanged water, 200 g of boehmite (tradename: DISPAL 10F4 manufactured by SASOL Ltd.) was added with stirring, and after continuing the stirring for 30 minutes, the system was left to stand at room temperature for one day, to obtain a boehmite dispersion having a solid content concentration of 20 mass % and a pH of 4.0.

To 19.0 g of the boehmite dispersion, 10.3 g of silica sol (tradename: SNOWTEX S manufactured by Nissan Chemical Industries, Ltd., solid content concentration: 30 mass %, pH: 10), 50.0 g of industrial ethanol (tradename: SOLMIX AP-1 manufactured by Japan Alcohol Trading Company Limited), 1.5 g of 1N nitric acid, 6.0 g of an aqueous solution containing 7 mass % of modified polyvinyl alcohol (tradename: Gohsefimer Z100 manufactured by Nippon Synthetic Chemical Industry Co., Ltd.) and 19.0 g of ion-exchanged water were added with stirring, followed by stirring for 5 minutes, to obtain a coating composition for forming a hydrophilic coating film comprising, by a solid content ratio, 55 parts by mass of boehmite, 45 parts by mass of silica and 6 parts by mass of polyvinyl alcohol and having a solid content concentration of 7 mass % and pH 5.2.

An agricultural film was obtained in the same manner as in Example 1 except that such a coating composition was used. With respect to such an agricultural film, the above evaluations were carried out, and the evaluation results are shown in Table 1.

Example 11

Comparative Example

To 800 g of ion-exchanged water, 200 g of boehmite (tradename: DISPAL 60 manufactured by SASOL Ltd.) was added with stirring, and after continuing the stirring for 30 minutes, the system was left to stand at room temperature for one day, to obtain a boehmite dispersion having a solid content concentration of 20 mass % and a pH of 7.0.

To 19.0 g of the boehmite dispersion, 10.3 g of silica sol (tradename: SNOWTEX S manufactured by Nissan Chemical Industries, Ltd., solid content concentration: 30 mass %, pH: 10), 50.0 g of industrial ethanol (tradename: SOLMIX AP-1 manufactured by Japan Alcohol Trading Company Limited), 1.5 g of 1N nitric acid, 6.0 g of an aqueous solution containing 7 mass % of modified polyvinyl alcohol (tradename: Gohsefimer Z100 manufactured by Nippon Synthetic Chemical Industry Co., Ltd.) and 19.0 g of ion-exchanged water were added with stirring, followed by stirring for 5 minutes, to obtain a coating composition for forming a hydrophilic coating film comprising, by a solid content ratio, 55 parts by mass of boehmite, 45 parts by mass of silica and 6 parts by mass of polyvinyl alcohol and having a solid content concentration of 7 mass % and pH 6.8.

An agricultural film was obtained in the same manner as in Example 1 except that such a coating composition was used. With respect to such an agricultural film, the above evaluations were carried out, and the evaluation results are shown in Table 1.

Example 12

To 800 g of ion-exchanged water, 200 g of boehmite (tradename: DISPAL 11N7-80 manufactured by SASOL Ltd.) was added with stirring, and after continuing the stirring for 30 minutes, the system was left to stand at room temperature for one day, to obtain a boehmite dispersion having a solid content concentration of 20 mass % and a pH of 5.3.

To 19.0 g of the boehmite dispersion, 15.5 g of silica sol (tradename: SNOWTEX XS manufactured by Nissan Chemical Industries, Ltd., solid content concentration: 20 mass %, pH: 10), 50.0 g of industrial ethanol (tradename: SOLMIX AP-1 manufactured by Japan Alcohol Trading Company Limited), 1.2 g of 1N nitric acid, 6.0 g of an aqueous solution containing 7 mass % of modified polyvinyl alcohol (tradename: Gohsefimer Z100 manufactured by Nippon Synthetic Chemical Industry Co., Ltd.) and 13.8 g of ion-exchanged water were added with stirring, followed by stirring for 5 minutes, to obtain a coating composition for forming a hydrophilic coating film comprising, by a solid content ratio, 55 parts by mass of boehmite, 45 parts by mass of silica and 6 parts by mass of polyvinyl alcohol and having a solid content concentration of 7 mass % and pH 5.5.

An agricultural film was obtained in the same manner as in Example 1 except that such a coating composition was used. With respect to such an agricultural film, the above evaluations were carried out, and the evaluation results are shown in Table 1.

Example 13

To 800 g of ion-exchanged water, 200 g of boehmite (tradename: DISPAL 11N7-80 manufactured by SASOL Ltd.) was added with stirring, and after continuing the stirring for 30 minutes, the system was left to stand at room temperature for one day, to obtain a boehmite dispersion having a solid content concentration of 20 mass % and a pH of 5.3.

To 19.0 g of the boehmite dispersion, 15.5 g of silica sol (tradename: SNOWTEX 20L manufactured by Nissan Chemical Industries, Ltd., solid content concentration: 20 mass %, pH: 10), 50 g of industrial ethanol (tradename: SOLMIX AP-1 manufactured by Japan Alcohol Trading Company Limited), 1.2 g of 1N nitric acid, 6.0 g of an aqueous solution containing 7 mass % of modified polyvinyl alcohol (tradename: Gohsefimer Z100 manufactured by Nippon Synthetic Chemical Industry Co., Ltd.) and 13.8 g of ion-exchanged water were added with stirring, followed by stirring for 5 minutes, to obtain a coating composition for forming a hydrophilic coating film comprising, by a solid content ratio, 55 parts by mass of boehmite, 45 parts by mass of silica and 6 parts by mass of polyvinyl alcohol and having a solid content concentration of 7 mass % and pH 4.9.

An agricultural film was obtained in the same manner as in Example 1 except that such a coating composition was used. With respect to such an agricultural film, the above evaluations were carried out, and the evaluation results are shown in Table 1.

Example 14

Comparative Example

To 800 g of ion-exchanged water, 200 g of boehmite (tradename: DISPAL 11N7-80 manufactured by SASOL Ltd.) was added with stirring, and after continuing the stirring for 30 minutes, the system was left to stand at room temperature for one day, to obtain a boehmite dispersion having a solid content concentration of 20 mass % and a pH of 5.3.

To 19.0 g of the boehmite dispersion, 7.7 g of silica sol (tradename: Cataloid SI80P manufactured by Catalysts & Chemicals Industries Co., Ltd., solid content concentration: 40 mass %, pH: 10), 50.0 g of industrial ethanol (tradename: SOLMIX AP-1 manufactured by Japan Alcohol Trading Company Limited), 1.5 g of 1N nitric acid, 6.0 g of an aqueous solution containing 7 mass % of modified polyvinyl alcohol (tradename: Gohsefimer Z100 manufactured by Nippon Synthetic Chemical Industry Co., Ltd.) and 21.6 g of ion-exchanged water were added with stirring, followed by stirring for 5 minutes, to obtain a coating composition for forming a hydrophilic coating film comprising, by a solid content ratio, 55 parts by mass of boehmite, 45 parts by mass of silica and 6 parts by mass of polyvinyl alcohol and having a solid content concentration of 7 mass % and pH 4.7.

An agricultural film was obtained in the same manner as in Example 1 except that such a coating composition was used. With respect to such an agricultural film, the above evaluations were carried out, and the evaluation results are shown in Table 1.

Example 15

To 800 g of ion-exchanged water, 200 g of boehmite (tradename: DISPAL 11N7-80 manufactured by SASOL Ltd.) was added with stirring, and after continuing the stirring for 30 minutes, the system was left to stand at room temperature for one day, to obtain a boehmite dispersion having a solid content concentration of 20 mass % and a pH of 5.3.

To 15.5 g of the boehmite dispersion, 12.6 g of silica sol (tradename: SNOWTEX S manufactured by Nissan Chemical Industries, Ltd., solid content concentration: 30 mass %, pH: 10), 50.0 g of industrial ethanol (tradename: SOLMIX AP-1 manufactured by Japan Alcohol Trading Company Limited), 1.8 g of 1N nitric acid, 6.0 g of an aqueous solution containing 7 mass % of modified polyvinyl alcohol (tradename: Gohsefimer Z100 manufactured by Nippon Synthetic Chemical Industry Co., Ltd.) and 12.6 g of ion-exchanged water were added with stirring, followed by stirring for 5 minutes, to obtain a coating composition for forming a hydrophilic coating film comprising, by a solid content ratio, 45 parts by mass of boehmite, 55 parts by mass of silica and 6 parts by mass of polyvinyl alcohol and having a solid content concentration of 7 mass % and pH 4.9.

An agricultural film was obtained in the same manner as in Example 1 except that such a coating composition was used. With respect to such an agricultural film, the above evaluations were carried out, and the evaluation results are shown in Table 1.

Example 16

To 800 g of ion-exchanged water, 200 g of boehmite (tradename: DISPAL 11N7-80 manufactured by SASOL Ltd.) was added with stirring, and after continuing the stirring for 30 minutes, the system was left to stand at room temperature for one day, to obtain a boehmite dispersion having a solid content concentration of 20 mass % and a pH of 5.3.

To 27.6 g of the boehmite dispersion, 4.6 g of silica sol (tradename: SNOWTEX S manufactured by Nissan Chemical Industries, Ltd., solid content concentration: 30 mass %, pH: 10), 50.0 g of industrial ethanol (tradename: SOLMIX AP-1 manufactured by Japan Alcohol Trading Company Limited), 0.6 g of 1N nitric acid, 6.0 g of an aqueous solution containing 7 mass % of modified polyvinyl alcohol (tradename: Gohsefimer Z100 manufactured by Nippon Synthetic Chemical Industry Co., Ltd.) and 17.0 g of ion-exchanged water were added with stirring, followed by stirring for 5 minutes, to obtain a coating composition for forming a hydrophilic coating film comprising, by a solid content ratio, 80 parts by mass of boehmite, 20 parts by mass of silica and 6 parts by mass of polyvinyl alcohol and having a solid content concentration of 7 mass % and pH 5.0.

An agricultural film was obtained in the same manner as in Example 1 except that such a coating composition was used. With respect to such an agricultural film, the above evaluations were carried out, and the evaluation results are shown in Table 1.

Example 17

To 800 g of ion-exchanged water, 200 g of boehmite (tradename: DISPAL 11N7-80 manufactured by SASOL Ltd.) was added with stirring, and after continuing the stirring for 30 minutes, the system was left to stand at room temperature for one day, to obtain a boehmite dispersion having a solid content concentration of 20 mass % and a pH of 5.3.

To 6.9 g of the boehmite dispersion, 18.4 g of silica sol (tradename: SNOWTEX S manufactured by Nissan Chemical Industries, Ltd., solid content concentration: 30 mass %, pH: 10), 50.0 g of industrial ethanol (tradename: SOLMIX AP-1 manufactured by Japan Alcohol Trading Company Limited), 2.6 g of 1N nitric acid, 6.0 g of an aqueous solution containing 7 mass % of modified polyvinyl alcohol (tradename: Gohsefimer Z100 manufactured by Nippon Synthetic Chemical Industry Co., Ltd.) and 21.6 g of ion-exchanged water were added with stirring, followed by stirring for 5 minutes, to obtain a coating composition for forming a hydrophilic coating film comprising, by a solid content ratio, 20 parts by mass of boehmite, 80 parts by mass of silica and 6 parts by mass of polyvinyl alcohol and having a solid content concentration of 7 mass % and pH 4.7.

An agricultural film was obtained in the same manner as in Example 1 except that such a coating composition was used. With respect to such an agricultural film, the above evaluations were carried out, and the evaluation results are shown in Table 1.

Example 18

Comparative Example

An agricultural film was obtained in the same manner as in Example 1 except that a coating composition having a composition obtained by omitting the modified polyvinyl alcohol from the hydrophilic coating material in Example 11 was produced and such a coating composition was used. With respect to such an agricultural film, the above evaluations were carried out, and the evaluation results are shown in Table 1.

Example 19

Comparative Example 35.0 g of silica sol (tradename: SNOWTEX OS manufactured by Nissan Chemical Industries, Ltd., solid content concentration: 20 mass %, pH: 3), 50.0 g of industrial ethanol (tradename: SOLMIX AP-1 manufactured by Japan Alcohol Trading Company Limited), 6.0 g of an aqueous solution containing 7 mass % of modified polyvinyl alcohol (tradename: Gohsefimer Z100 manufactured by Nippon Synthetic Chemical Industry Co., Ltd.) and 15.0 g of ion-exchanged water were added with stirring, followed by stirring for 5 minutes, to obtain a coating composition for forming a hydrophilic coating film comprising 100 parts by mass of silica and 6 parts by mass of polyvinyl alcohol and having a solid content concentration of 7 mass % and pH 3.3.

An agricultural film was obtained in the same manner as in Example 1 except that such a coating composition was used. With respect to such an agricultural film, the above evaluations were carried out, and the evaluation results are shown in Table 1.

Example 20

Comparative Example 35.0 g of boehmite dispersion in Example 3, 50.0 g of industrial ethanol (tradename: SOLMIX AP-1 manufactured by Japan Alcohol Trading Company Limited), 6.0 g of an aqueous solution containing 7 mass % of modified polyvinyl alcohol (tradename: Gohsefimer Z100 manufactured by Nippon Synthetic Chemical Industry Co., Ltd.) and 15.0 g of ion-exchanged water were added with stirring, followed by stirring for 5 minutes, to obtain a coating composition for forming a hydrophilic coating film comprising 100 parts by mass of boehmite and 6 parts by mass of polyvinyl alcohol and having a solid content concentration of 7 mass % and pH 5.0.

An agricultural film was obtained in the same manner as in Example 1 except that such a coating composition was used. With respect to such an agricultural film, the above evaluations were carried out, and the evaluation results are shown in Table 1.

TABLE 1

| | Al/Si | Average particle diameter of silica (nm) | Crystallite diameter of boehmite (nm) | Thickness (nm) | Total pore volume ($10^{-4}$ cc/g) | Appearance | Haze value (%) | Transmittance (%) | Contact angle (°) | Low temperature wettability | Durability of wettability | Abrasion resistance (%) |
|---|---|---|---|---|---|---|---|---|---|---|---|---|
| Ex. 1 | 1.1 | 12 | 32 | 350 | 8 | ○ | 1.5 | 95 | 15 | ◎ | ○ | 92 |
| Ex. 2 | 1.1 | 12 | 40 | 350 | 4.9 | ○ | 3 | 94 | 15 | ○ | ○ | 95 |
| Ex. 3 | 0.8 | 12 | 32 | 280 | 2.6 | ○ | 2.5 | 94 | 15 | ◎ | ○ | 75 |
| Ex. 4 (Comp. Ex.) | 1.1 | 12 | 15 | 350 | 0.5 | ○ | 3 | 93 | 20 | X | — | 50 |
| Ex. 5 (Comp. Ex.) | 8.1 | 12 | 32 | 350 | 9 | ○ | 8 | 95 | 15 | ○ | Δ | 30 |
| Ex. 6 (Comp. Ex.) | 0.1 | 12 | 32 | 350 | 10 | ○ | 1 | 95 | 15 | ○ | X | 90 |
| Ex. 7 (Comp. Ex.) | 1.1 | 12 | 15 | 350 | 5 | ○ | 1 | 94 | 27 | Δ | Δ | 61 |
| Ex. 8 | 1.1 | 12 | 23 | 350 | 5.2 | ○ | 1.1 | 94 | 26 | ○ | ○ | 93 |
| Ex. 9 | 1.1 | 12 | 32 | 350 | 8.3 | ○ | 1.5 | 94 | 7 | ◎ | ◎ | 94 |
| Ex. 10 | 1.1 | 12 | 40 | 350 | 4.9 | ○ | 3 | 94 | 9 | ◎ | ○ | 92 |
| Ex. 11 (Comp. Ex.) | 1.1 | 12 | 61 | 350 | 3.5 | ○ | 60 | 93 | 10 | ○ | Δ | 90 |
| Ex. 12 | 1.1 | 5 | 32 | 350 | 4.7 | ○ | 1.3 | 94 | 7 | ◎ | Δ | 95 |
| Ex. 13 | 1.1 | 45 | 32 | 350 | 4.1 | ○ | 4.7 | 94 | 8 | ○ | ○ | 80 |
| Ex. 14 (Comp. Ex.) | 1.1 | 80 | 32 | 350 | 3.7 | ○ | 8 | 94 | 15 | ○ | Δ | 75 |
| Ex. 15 | 0.7 | 12 | 32 | 600 | 9 | ○ | 2.5 | 94 | 12 | ◎ | ◎ | 82 |
| Ex. 16 | 3.6 | 12 | 32 | 350 | 4 | ○ | 5 | 93 | 15 | ○ | ○ | 70 |
| Ex. 17 | 0.2 | 12 | 32 | 350 | 3.2 | ○ | 1 | 94 | 12 | ○ | Δ | 90 |
| Ex. 18 (Comp. Ex.) | 0.2 | 12 | 32 | 100 | 1.5 | ○ | 0.8 | 94 | 8 | ◎ | X | 74 |
| Ex. 19 (Comp. Ex.) | — | 12 | — | 350 | 4 | ○ | 0.9 | 94 | 20 | ○ | XX | 90 |
| Ex. 20 (Comp. Ex.) | — | — | 32 | 350 | 3.5 | ○ | 1 | 93 | 25 | ○ | X | 55 |

INDUSTRIAL APPLICABILITY

By the agricultural film of the present invention having a hydrophilic coating film formed, it is possible to present durability of high wettability, whereby the agricultural film can be used for a long period of time.

The entire disclosures of Japanese Patent Application No. 2009-030955 filed on Feb. 13, 2009 and Japanese Patent Application No. 2009-030956 filed on Feb. 13, 2009 including specifications, claims, drawings and summaries are incorporated herein by reference in their entireties.

REFERENCE SYMBOLS

| 10: | Agricultural film |
| 12: | Base material film |
| 14: | Hydrophilic coating film |

What is claimed is:

1. An agricultural film comprising a base material film and a porous hydrophilic coating film which is formed on the base material film and which comprises boehmite particles, silica particles and a binder and satisfies the following (a) to (c):
   (a) the atomic ratio of Al to Si (Al/Si) is from 0.2 to 5.0,
   (b) the average particle diameter of the silica particles is from 5 to 50 nm, and
   (c) the crystallite diameter of the boehmite particles, as calculated from the diffraction peak of the (120) plane, is from 20 to 50 nm.

2. The agricultural film according to claim 1, wherein the binder is a nonionic water-soluble organic binder.

3. The agricultural film according to claim 2, wherein the nonionic water-soluble organic binder comprises a water-soluble polyvinyl alcohol.

4. The agricultural film according to claim 1, wherein the base material film comprises a fluororesin film.

5. The agricultural film according to claim 4, wherein the fluororesin film comprises a tetrafluoroethylene/ethylene copolymer film.

6. The agricultural film according to claim 1, wherein the hydrophilic coating film has a thickness of from 100 to 700 nm.

7. The agricultural film according to claim 1, wherein in the hydrophilic coating film, the total pore volume of pores having diameters of from 1 to 60 nm is from 1.0 to 20.0 [$\times 10^{-4}$ cc/g].

8. The agricultural film according to claim 1, wherein the proportion of the binder in the hydrophilic coating film is from 0.5 to 15 parts by mass per 100 parts by mass in total of the boehmite particles and the silica particles.

9. The agricultural film according to claim 1, wherein the haze of the hydrophilic coating film is at most 5%.

10. A process for producing the agricultural film as defined in claim 1, which comprises applying a composition comprising boehmite particles, silica particles, a binder and water, on a surface of a base material film, followed by drying to form a hydrophilic coating film.

11. The process for producing the agricultural film according to claim 10, wherein the base material film is a fluororesin film.

12. The process for producing the agricultural film according to claim 11, wherein surface treatment to improve wettability is preliminarily applied to the surface of the fluororesin film on which the hydrophilic coating film is to be formed.

13. The agricultural film according to claim 1, wherein said Al/Si is from 0.4 to 2.1.

14. The agricultural film according to claim 1, wherein, said Al/Si is from 0.6 to 1.4.

15. The agricultural film according to claim 1, wherein said average particle diameter of said silica particles is 8 to 15 nm.

16. The agricultural film according to claim 1, wherein said silica particles have a spherical shape.

17. The agricultural film according to claim 1, wherein said silica particles have an average particle diameter of from 10 to 30 nm.

18. The agricultural film according to claim 1, wherein said hydrophilic coating film comprises plate-shaped boehmite particles.

19. The agricultural film according to claim 1, wherein said hydrophilic coating film has a thickness of from 250 to 450 nm.

20. The agricultural film according to claim 1, wherein in the hydrophilic coating film, the total pore volume of pores having diameters of from 1 to 60 nm is from 2.0 to $10.0 [\times 10^{-4}$ cc/g].

* * * * *